United States Patent
Brueck et al.

(10) Patent No.: US 9,623,378 B2
(45) Date of Patent: Apr. 18, 2017

(54) METHOD FOR OPERATING AN EXHAUST GAS TREATMENT DEVICE AND MOTOR VEHICLE HAVING THE DEVICE

(71) Applicant: EMITEC GESELLSCHAFT FÜR EMISSIONSTECHNOLOGIE MBH, Lohmar (DE)

(72) Inventors: Rolf Brueck, Bergisch Gladbach (DE); Peter Bauer, Siegburg (DE); Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 579 days.

(21) Appl. No.: 13/770,069

(22) Filed: Feb. 19, 2013

(65) Prior Publication Data

US 2013/0167512 A1  Jul. 4, 2013

Related U.S. Application Data

(63) Continuation of application No. PCT/EP2011/063912, filed on Aug. 12, 2011.

(30) Foreign Application Priority Data

Aug. 18, 2010 (DE) .......... 10 2010 034 707
Oct. 20, 2010 (DE) .......... 10 2010 049 070

(51) Int. Cl.
  *F01N 3/00* (2006.01)
  *B01D 53/94* (2006.01)
  (Continued)

(52) U.S. Cl.
  CPC ......... *B01D 53/9495* (2013.01); *F01N 3/035* (2013.01); *F01N 3/0871* (2013.01);
  (Continued)

(58) Field of Classification Search
  CPC .............................. F01N 3/208; F01N 3/2018
  USPC .................................................... 60/272–324
  See application file for complete search history.

(56) References Cited

U.S. PATENT DOCUMENTS 7,181,337 B2 *   2/2007  Kosaka .............. 701/110
2004/0206069 A1 * 10/2004  Tumati et al. ............ 60/285
(Continued)

FOREIGN PATENT DOCUMENTS

DE   10 2007 040 439 A1   3/2009
DE      102008036885 A1   2/2010
(Continued)

OTHER PUBLICATIONS

International Search Report of PCT/EP2011/063912.

*Primary Examiner* — Audrey K Bradley
*Assistant Examiner* — Anthony Ayala Delgado
(74) *Attorney, Agent, or Firm* — Laurence A. Greenberg; Werner H. Stemer; Ralph E. Locher (57) ABSTRACT

A method for operating an exhaust gas treatment device having at least one reservoir for a reducing agent and at least one delivery device for a reducing agent, includes at least checking a filling level of the at least one reservoir, checking a current exhaust gas mass flow, and delivering reducing agent if the filling level of the at least one reservoir is below a minimum filling level and the exhaust gas mass flow is in a low-load range. A motor vehicle having the exhaust gas treatment device is also provided.

12 Claims, 4 Drawing Sheets

(51) Int. Cl.
    *F01N 3/035*     (2006.01)
    *F01N 3/08*     (2006.01)
    *F01N 3/10*     (2006.01)
    *F01N 3/20*     (2006.01)
    *F01N 11/00*     (2006.01)
    *F01N 9/00*     (2006.01)

(52) U.S. Cl.
    CPC ............. *F01N 3/103* (2013.01); *F01N 3/208* (2013.01); *F01N 11/00* (2013.01); *B01D 2251/2067* (2013.01); *F01N 9/005* (2013.01); *F01N 2240/16* (2013.01); *F01N 2550/05* (2013.01); *F01N 2560/07* (2013.01); *F01N 2610/00* (2013.01); *F01N 2610/02* (2013.01); *F01N 2610/10* (2013.01); *F01N 2610/1406* (2013.01); *F01N 2900/0411* (2013.01); *F01N 2900/14* (2013.01); *F01N 2900/1402* (2013.01); *F01N 2900/1404* (2013.01); *F01N 2900/1411* (2013.01); *F01N 2900/1622* (2013.01); *F01N 2900/1814* (2013.01); *Y02T 10/24* (2013.01); *Y02T 10/47* (2013.01)

(56) References Cited

U.S. PATENT DOCUMENTS

| | | |
|---|---|---|
| 2007/0204600 A1 | 9/2007 | Kubinski et al. |
| 2008/0173010 A1* | 7/2008 | Suresh ............... F01L 1/34 60/287 |
| 2008/0306631 A1* | 12/2008 | Huang ........................ 700/271 |
| 2010/0024390 A1 | 2/2010 | Wills et al. |
| 2010/0057328 A1* | 3/2010 | Brown ................ F02D 41/027 701/103 |
| 2010/0101214 A1 | 4/2010 | Herman et al. |
| 2010/0170226 A1 | 7/2010 | Prakash et al. |
| 2010/0326051 A1 | 12/2010 | Busch et al. |
| 2011/0005209 A1* | 1/2011 | Gady ..................... F01N 3/103 60/295 |
| 2011/0030343 A1* | 2/2011 | Kiser .................... F01N 3/208 60/274 |
| 2011/0113753 A1 | 5/2011 | Christner et al. |
| 2011/0192148 A1 | 8/2011 | Yasui |
| 2012/0006010 A1* | 1/2012 | Kaemingk et al. ............ 60/286 |
| 2012/0085081 A1* | 4/2012 | Mohammed et al. .......... 60/274 |
| 2012/0255285 A1* | 10/2012 | Gonze et al. ................... 60/286 |

FOREIGN PATENT DOCUMENTS

| | | |
|---|---|---|
| DE | 10 2008 042 763 A1 | 4/2010 |
| EP | 2 180 157 A2 | 4/2010 |
| EP | 2 357 334 A1 | 8/2011 |
| JP | 2009270449 A | 11/2009 |
| JP | 2010065581 A | 3/2010 |
| JP | 2010127084 A | 6/2010 |
| WO | 2006/003868 A1 | 1/2006 |
| WO | 2008/138682 A1 | 11/2008 |

* cited by examiner

METHOD FOR OPERATING AN EXHAUST GAS TREATMENT DEVICE AND MOTOR VEHICLE HAVING THE DEVICE

CROSS-REFERENCE TO RELATED APPLICATION

This application is a continuation, under 35 U.S.C. §120, of copending International Application No. PCT/EP2011/063912, filed Aug. 12, 2011, which designated the United States; this application also claims the priorities, under 35 U.S.C. §119, of German Patent Application Nos. DE 10 2010 034 707.8, filed Aug. 18, 2010 and DE 10 2010 049 070.9, filed Oct. 20, 2010; the prior applications are herewith incorporated by reference in their entirety.

BACKGROUND OF THE INVENTION

Field of the Invention

The invention relates to a method for operating an exhaust gas treatment device for an internal combustion engine, having at least one reservoir and at least one delivery device for a reducing agent. The invention also relates to a motor vehicle having the exhaust gas treatment device.

Exhaust gas treatment devices have long been used for reducing the pollutants in the exhaust gases from internal combustion engines. Of those, exhaust gas treatment devices having a delivery for an additive (fuel, oxygen, urea, etc.) have also been proposed as an effective way of reducing pollutants in the exhaust gas of an internal combustion engine by using the additive.

It has proved to be advantageous, particularly in the case of lean-burn internal combustion engines, to deliver a reducing agent to the exhaust gas. Lean-burn internal combustion engines are operated with a fuel-air-mixture in which more air is delivered than is necessary for complete conversion of the fuel being delivered. Such internal combustion engines are, in particular, modern diesel engines.

In particular, the proportion of nitrogen oxide compounds ($NO_x$) in the exhaust gas, especially, is increased in the case of lean-burn internal combustion engines and can be reduced in an exhaust gas treatment device in conjunction with a reducing agent. That is referred to as the method of selective catalytic reduction (SCR-method).

Ammonia, for example, may be used as a reducing agent. Ammonia is converted, together with the nitrogen oxide compounds in the exhaust gas, into harmless constituents, that is to say nitrogen, water and carbon dioxide. Ammonia is normally not stored directly in the motor vehicle. A reducing agent precursor, which is converted as necessary into the actual reducing agent, is normally stored and/or delivered. Urea, for example, may serve as such a reducing agent precursor. An aqueous urea solution is especially preferred. Such an aqueous urea solution with a urea content of 32.5%, for example, is available under the trademark AdBlue®.

A reducing agent can be delivered to an exhaust gas treatment device of an internal combustion engine in liquid and/or gaseous form. In a motor vehicle, the reducing agent is normally stored in liquid form. Such liquid storage is especially space-saving. That also means, however, that some vaporization takes place prior to or during the addition of the liquid reducing agent, in particular also in the area of the exhaust gas treatment device. With that vaporization it is particularly important that vaporization is rapid and as complete as possible and distributed uniformly in the exhaust gas and the exhaust gas treatment device. Liquid deposits on areas of the exhaust gas pipe (in particular, on those areas of the exhaust pipe which the fluid mechanics render scarcely accessible for the exhaust gas) can lead to unwanted corrosion or the like. Moreover, that means that the full quantity of reducing agent is not available for conversion of the nitrogen oxides and a greater consumption of reducing agent is usually also a feature.

SUMMARY OF THE INVENTION

It is accordingly an object of the invention to provide a method for operating an exhaust gas treatment device and a motor vehicle having the device, which overcome the hereinafore-mentioned disadvantages and further alleviate the highlighted technical problems of the heretofore-known methods and vehicles of this general type. In particular, the intention is to propose a method for operating an exhaust gas treatment device, which allows a reliable conversion of nitrogen oxides by the SCR method even in the event of very frequent load cycles of the internal combustion engine. A further intention is to specify an especially effective and energy-efficient strategy for the addition of the reducing agent, in which in particular reducing agent intermediate reservoirs within the exhaust system are supplied with reducing agent for a correspondingly modest outlay.

With the foregoing and other objects in view there is provided, in accordance with the invention, a method for operating an exhaust gas treatment device having at least one reservoir for a reducing agent and at least one delivery device for a reducing agent. The method comprises at least the following steps:

a) checking a filling level of the at least one reservoir;
b) checking a current exhaust gas mass flow; and
c) delivering reducing agent, if the filling level of the at least one reservoir is below a minimum filling level and the exhaust gas mass flow is in a low-load range.

The exhaust gas treatment device is formed, in particular, with an exhaust pipe, through which the exhaust gas produced by an internal combustion engine is led. A reservoir for the reducing agent is consequently positioned in the exhaust gas treatment device so that the reducing agent discharged by the delivery device reaches this reservoir at least some of the time. In this case the reducing agent may be admitted to the reservoir in the direction of flow and/or counter to the direction of flow and where necessary, multiple reservoirs and/or delivery devices may also be provided. The delivery device in the main includes a nozzle or an injector, so that the (liquid) reducing agent can be fed (generally finely dispersed) at an excess pressure into the exhaust pipe. The method relates, then, to operation of such an exhaust gas treatment device.

During the operation of an internal combustion engine the individual steps in the method according to the invention are normally repeated in the order specified herein in the manner of a loop.

The term reducing agent is used herein as a generic term both for a reducing agent (such as ammonia, for example) and for a reducing agent precursor, such as urea or aqueous urea solution, for example.

A distinctive feature of the method according to the invention is that reducing agent only ensues as a result of the checking of the filling level of the at least one reservoir and the checking of a current exhaust gas mass flow.

A buffer quantity of reducing agent is stored in the reservoir of the exhaust gas treatment device. This serves, in particular, to ensure that a certain quantity of reducing agent is stored right in the exhaust gas flow, which when the corresponding ambient conditions prevail in the exhaust system is (steadily) delivered to the exhaust gas for reaction with the prevailing exhaust gas constituents. A reservoir or storage device for the intermediate storage of a quantity of reducing agent may, for example, be a storage coating on a substrate (for example a honeycomb body) in contact with the exhaust gas, which is capable of storing ammonia particularly in a specific temperature range. Such a reservoir may also be provided in conjunction with the coating in a honeycomb body intended for selective catalytic reduction. This is also possible in the form of a mixed coating, which has both ammonia-storing fractions, and fractions supporting this selective catalytic reduction. Such a reservoir is preferably capable of storing sufficient reducing agent for an operating period of between 1 minute and 1 hour, for example, preferably between 5 and 30 minutes, in order to ensure that the selective catalytic reduction can ensue in the exhaust gas treatment device without renewed delivery of reducing agent.

Such an intermediate storage of reducing agent in the exhaust gas treatment device serves to ensure that especially favorable times can be used for the delivery/vaporization of reducing agent, without always needing to match this precisely to the actual demand for reducing agent in the exhaust gas treatment device.

The quantity of reducing agent currently stored in a reservoir can be determined by suitable sensors and/or calculated. The quantity stored can be measured by a capacitative sensor, for example, which is inserted into the reservoir and which varies its capacitance as a function of the stored quantity of reducing agent. Similarly, resistive and inductive sensors, which register a variation of the electrical or magnetic resistance as a function of the stored quantity of reducing agent, are also feasible. Also feasible is a caloric sensor, which registers the heat capacity in the reservoir space either through increased current demand at a constant temperature or reduced temperature at a constant current demand. It is equally possible to register or to calculate the performance of the exhaust gas treatment device as a function of the load states of the internal combustion engine prevailing at any given time, so that a map is available, for example, from which it is possible to calculate the storage and depletion of the reducing agent. The filling level can then also be determined from these calculations and used for checking.

A check is also performed in this case on how much exhaust gas is currently flowing through the exhaust gas treatment device. The exhaust gas mass flow can be checked by a wide variety of measuring devices. Particularly suitable are flow-based measuring devices, such as propellers and Prandl's tubes (pressure differential between backpressure and ambient pressure) on one hand and measuring devices based on heat capacities, such as anemometers and calorimeters, on the other. In order to minimize the equipment outlay in this case, however, it is also possible to calculate the current exhaust gas mass flow. The known or measured parameters (air delivery, fuel delivery, load state, etc.) can be used for this purpose, so that it is possible to determine and to check the exhaust gas mass flow currently prevailing in the exhaust pipe with sufficient accuracy.

A distinctive feature of the method according to the invention is that a reducing agent is delivered only when the filling level, determined as described above, is below a minimum filling level. In a technically suitable construction of a reservoir for reducing agent it is not necessary for the reservoir to be filled to maximum at all times. Instead, the reservoir is suitably constructed so that a filling level of 50% to 70% is sufficient for medium-term operation. The minimum filling level is then 20%, for example, or preferably 30%, so that on one hand it is ensured that there is always reducing agent available in the reservoir, and on the other hand no needlessly brief time intervals between the delivery steps of reducing agent have to be established. The suitable value for a minimum filling level therefore depends on the quantity of exhaust gas to be filtered and the structure of the reservoir in the context of the exhaust gas treatment device.

At the same time it is also possible to ensure that no escape of reducing agent occurs. An escape of reducing agent means that reducing agent gets out of the exhaust system. Ammonia or an ammonia precursor is often used as reducing agent. Ammonia is normally stored in a reservoir. An unwanted escape can occur if there is insufficient capacity for storing the delivered reducing agent in the exhaust system and at the same time more reducing agent is available in the exhaust gas than is needed for conversion of the pollutants present, and/or the conversion of pollutants with the exhaust gas is not functioning correctly. The conversion may not function or may be reduced, for example, if the temperature is below a start-up temperature or a threshold temperature for catalytic reduction.

In the event of a temperature increase, the storage capacity of a reducing agent reservoir often also falls. This is due to the characteristics of a reservoir. For this reason a percentage storage quantity of reducing agent in a reducing agent reservoir may increase sharply as the temperature rises, although the absolute storage quantity is constant. Sudden temperature increases can occur in a motor vehicle at any time, for example when a low-load phase is followed by a high-load phase. In order to have sufficient storage capacity still available even in such a situation, an ammonia reservoir should not be completely filled. In particular, a reservoir content of 30% to 40% in the low-load range is advantageous in order to effectively absorb reservoir peak contents during possible high-load phases with very high exhaust gas temperatures.

In deciding on a suitable percentage reservoir content after a reservoir filling process, at least one of the following parameters may also be taken into account:
 a) current temperature in an exhaust gas recirculation line,
 b) current engine speed,
 c) current engine load, and
 d) current exhaust gas mass flow.

All of these parameters characterize the load state of an internal combustion engine, which is characterized with particular accuracy if more than one of these parameters is taken into account. If the load state of the internal combustion engine when delivering the reducing agent is known with particular accuracy, it is also possible to estimate the possible increase in the filling level of the reservoir due to an increase in temperature. In percentage terms a reservoir can be filled to a greater degree if the load of the internal combustion engine is already increased during the filling process, because a possible further increase in the load then proves to be less than is the case with a very small initial load.

In deciding on a suitable percentage reservoir content after a filling process, it is also possible to link it to an untreated nitrogen oxide mass model of the connected combustion engine. In an untreated nitrogen oxide mass model a flow of untreated nitrogen oxide emissions upstream of a storage catalytic converter can be calculated from the operating parameters of the internal combustion engine and, in particular, from the current fuel-air ratio. The fuel-air ratio has a decisive influence on the flow of untreated emissions. The flow of untreated emissions in turn constitutes a further important influence on the storage capacity of a reducing agent reservoir in an exhaust system.

A further condition of the method according to the invention for the delivery of reducing agent is that the exhaust gas mass flow is in a low-load range. In the low-load range the load is reduced, particularly in comparison to a driving mode of the internal combustion engine, and a reduced exhaust gas mass flow prevails. Such low-load ranges are to be encountered particularly during idling and/or in overrun conditions. Such a low-load range includes, in particular, the operation of a motor vehicle in the city (urban traffic), during which stop-and-go and/or low overall vehicle speeds are prevalent.

In typical internal combustion engines, such as those used in motor vehicles, for example, low-load ranges are characterized, for example, by engine speeds of between 600 and 1200 1/min [revolutions per minute] and mass flows of between 20 and 200 kg/h [kilograms per hour].

It has been found that the conditions in this low-load range are particularly suited to vaporization and replenishing of the reservoir. The low exhaust gas mass flow in this phase allows an improved heat supply to the reducing agent by external (electrically powered) heaters and/or a virtually complete addition of the reducing agent to the reservoir. An especially efficient addition of the reducing agent to the exhaust gas treatment device is thus achieved.

In accordance with another particularly advantageous mode of the method of the invention, prior to step c), the current exhaust gas mass flow checked in step b) is evaluated by an energy model, in order to determine whether or not reducing agent is or should be delivered in step c).

In accordance with a further advantageous mode of the method of the invention, prior to step c), the current exhaust gas mass flow checked in step b) and a checked influencing variable of a heater are evaluated by an energy model, in order to determine whether or not at least one of the following actions is performed in step c):

heating of at least the exhaust gas flow or the reducing agent, and delivery of reducing agent.

In accordance with an added mode of the method of the invention, the energy model also takes into account an amount of energy which is produced by at least one chemical or physical reaction when a quantity of reducing agent is delivered.

In an energy model one or more components of a device together or a complete device are regarded as an energy accumulator. The energy model can be drawn up for an exhaust gas treatment device, for example, or for a portion of an exhaust gas treatment device. The energy accumulator may also be referred to as a system. This energy accumulator is defined by an energy model boundary or system boundary. All energy flows which flow beyond this system boundary into the energy accumulator or out of the energy accumulator are considered within the framework of the system model and are, in particular, added up. Thus, taken together, it is possible to infer the variation in an amount of energy stored in the energy accumulator. This amount of energy stored may also be referred to as internal energy. The incoming energy flows in this case increase the amount of energy stored. The outgoing energy flows reduce the amount of energy stored.

Energy flows which enter the energy accumulator or leave this energy accumulator may be of different types. A basic distinction is to be drawn between stored-energy flows and free-energy flows. A stored-energy flow is, for example, the heat energy of the exhaust gas passing into an exhaust gas treatment device with an exhaust gas mass flow. A free-energy flow is, for example, an electrical heating output of a heating device in an exhaust gas treatment device serving to heat up the exhaust gas. The energy in stored-energy flows is often substantially dependent upon the thermodynamic state of the mass flow of the exhaust gas and/or of the reducing agent itself, which is characterized by the temperature, the entropy, the pressure, the specific volume and the aggregate state of the mass flow. Another form of stored-energy flow is a mass flow which contains chemical energy, which can be converted within the energy accumulator or the system.

It is to be pointed out in this case that a reducing agent mass flow or a reducing agent precursor mass flow absorbs or releases energy though conversion or storage in a reducing agent reservoir. An exhaust gas mass flow furthermore contains pollutant constituents (in particular nitrogen oxide compounds and/or carbon compounds). They can partially be ascribed to incomplete combustion. Those pollutant constituents still contain chemical energy, which can be released by a catalytic conversion of the pollutant constituents in a suitable exhaust gas treatment device.

It can already be determined by an energy model prior to a reducing agent delivery whether or not reducing agent can be delivered under the prevailing conditions and at the same time whether or not a desired, preferably complete conversion and/or storage in a reservoir takes place. For this purpose the future energy flows that can be expected to enter the energy accumulator of the energy model, and the energy flows leaving the energy accumulator, and the amount of energy needed in the energy accumulator for storage of the reducing agent and/or the amount of energy released can be predicted in an energy model. For example, a predicted internal energy of the energy accumulator can then be used to establish whether or not a conversion and/or storage ensues in the desired manner. For this purpose, for example, the predicted internal energy can be directly compared with an internal energy needed for the quantity of reducing agent to be delivered.

An energy model is preferably filed in a control unit (for example in the form of a data processing program), in which the calculations and comparisons described are executed. In this case various simplifications of the energy model are possible in the control unit. For example, it is possible in the control unit to account not for the energy flows as such, but only for equivalent parameters, which represent the energy flows. Equivalent parameters, for example, may be the temperatures of individual mass flows.

In accordance with an additional advantageous mode of the method of the invention, the exhaust gas treatment device includes at least one heater and the method further includes the following steps:

checking the exhaust gas temperature prior to step c);

heating at least the exhaust gas flow or the reducing agent with the at least one heater, if the exhaust gas temperature is below a minimum temperature limit.

Before it can react with the nitrogen oxides in the exhaust gas, liquid reducing agent must first be vaporized. In the delivery of liquid reducing agent it is preferable that the vaporization of the reducing agent take place in the exhaust gas treatment device.

In modern internal combustion engines exhaust gas temperatures in the low-load range are often so low that a complete vaporization of the reducing agent cannot be achieved solely with the aid of the heat of the exhaust gas. In the delivery of liquid reducing agent to the exhaust gas, the reducing agent may possibly cool the exhaust gas even further and may thereby possibly also cool the additional (temperature-sensitive) catalytically active exhaust gas treatment constituents being stored. The conversion of the pollutants in an exhaust gas treatment device depends primarily also on the temperature of the exhaust gases. Most of the conversion processes of pollutants, such as nitrogen oxide, carbon monoxide and/or soot particles (carbon particles), for example, run considerably faster at high exhaust gas temperatures than at low exhaust gas temperatures. Below specific temperature limits, which vary for different conversion processes, certain conversion processes no longer occur at all.

For the aforementioned reasons it is preferable, particularly in the case of exhaust gas treatment devices for lean-burn internal combustion engines, to provide at least one (controllable) heater in the exhaust gas treatment devices. Such a heater may be installed in the form of a heating coil, for example, which is fitted in the exhaust pipe. However, a heater is preferably embodied in the form of an electrically heated honeycomb body, in which an electrical current flows through packs of multiple, at least partially structured metal foils. Such electrically heated honeycomb bodies have the advantage that they have a substantially larger surface over which they are able to release the heat generated to the exhaust gas and the reducing agent.

The operation of such electrically heated honeycomb bodies is to be specifically induced, since they consume current. Strategies are therefore required, through which an electrical heater in an exhaust system can be operated in such a way that on one hand it contributes to the advantageous conversion of the exhaust gases and the reducing agent in the exhaust gas treatment device, and on the other hand so that it has the lowest possible energy consumption.

Increased temperatures are routinely necessary during the delivery of reducing agent. This is because the reducing agent or the reducing agent precursor being delivered has to be regularly converted into a gas or into vapor. For example, a urea-water solution, which has to be converted into ammonia in the exhaust system, is used as a reducing agent precursor. Various chemical processes may be involved in converting the reducing agent.

One of these processes is hydrolysis in a hydrolysis catalytic converter. The reducing agent is converted therein into ammonia under the influence of a catalytically acting hydrolytic-coating. For this to happen, temperatures in the exhaust gas in excess of a threshold temperature, which frequently exceed approximately 150° C., or even reach approximately 200° C., are necessary. The temperature necessary for hydrolysis of a urea-water solution can still possibly be reduced by the presence of ammonia [$NH_3$] and nitrogen dioxide [$NO_2$]. Temperatures of between just 130° C. and 160° C. may then suffice for the hydrolysis.

A further chemical process which can lead to conversion of the reducing agent is thermolysis. Thermolysis is the purely thermal conversion of reducing agent or reducing agent precursor to the ultimate reducing agent without the influence of a catalytically acting hydrolytic coating. The temperature required for the thermolysis of reducing agent is always higher than the temperature needed for hydrolysis. The temperature necessary for hydrolysis crucially depends on the hydrolytic coating being used. In order to ensure that hydrolysis may take place, it may be that no independent hydrolysis catalytic converter at all is required, with it being possible instead, in another exhaust gas treatment component, to provide a coating which allows hydrolysis. One example of this is an iron-zeolite coating. An iron-zeolite coating may be present, for example, in an SCR catalytic converter for converting nitrogen oxide by using the reducing agent. This conversion reaction is likewise catalyzed by the iron-zeolite coating. There is often no clear temperature limit for the onset of the thermolysis of reducing agent precursors. The thermolysis takes place over a wide temperature range simultaneously with the hydrolysis of the reducing agent.

In particular, the minimum temperature limit is selected so as to ensure that liquid reducing agent vaporizes. The conduct of the method is particularly advantageous if a reducing agent does not have to be chemically converted in order to become active in the exhaust gas treatment device, but only needs to be converted from the liquid aggregate state into the gaseous aggregate state. In the case of reducing agent precursors such as urea-water solutions, for example, an at least partial conversion by thermolysis and/or hydrolysis may also already run in parallel with the vaporization.

Heating for the purpose of attaining an exhaust gas temperature in excess of the minimum temperature limit, as defined above, can take place both prior to, during and after step c), in other words the delivery of the reducing agent. In this case, in particular, besides checking of the exhaust gas temperature it is also possible to incorporate the results of steps a) and b). As already mentioned above, the temperature necessary for the hydrolysis of a urea-water solution may be reduced by the presence of ammonia and nitrogen dioxide. The heating can therefore be adjusted to the filling level of the at least one reservoir. This means, in particular, that with a low filling level of the reservoir the exhaust gas temperature is raised further by the heating than when the filling level of the reservoir is high.

During the delivery of reducing agent and during the heating process the heating strategy is preferably also monitored by a hydrolysis model. Such a hydrolysis model can be filed in a control unit in the form of a hydrolysis map. The hydrolysis model may be linked to the energy model, so that all parameters that are taken into account in the energy model can also be taken into account in the hydrolysis model. The hydrolysis models serves to monitor whether or not conditions conducive to hydrolysis prevail throughout the entire heating process and the entire delivery process. One simple embodiment monitors whether or not a sufficiently high temperature prevails in the exhaust gas treatment device throughout the entire delivery process. It is thus possible to ensure that the reducing agent is converted and no deposits of unconverted or partially converted reducing agent occur in the exhaust gas treatment device. Amounts of energy are analyzed for preventing deposits.

Such a hydrolysis model is particularly advantageous because direct monitoring of the prevailing temperature in an exhaust gas treatment device often cannot be performed fast enough to ensure that the delivery of reducing agent is promptly interrupted if the temperatures fall too sharply. (Inexpensive) temperature sensors which are suitable for use in exhaust gas treatment devices are in many cases too slow.

It is particularly important, in connection with the energy model and the avoidance of deposits of reducing agent, and in particular urea, to avoid water hammer. Water hammer occurs in an exhaust gas treatment device if it is still very cold shortly after starting up the internal combustion engine. Water vapor contained in the exhaust gas then condenses in the exhaust gas treatment device. One particularly negative effect of water hammer is that it greatly reduces the reaction times of sensors in an exhaust gas treatment device (especially of temperature sensors and lambda probes). In order for a thermodynamic model to work, therefore, it is advantageous to avoid water hammer. This can be done by operating a heater in the exhaust gas treatment device during a cold-starting phase in such a way that no water hammer occurs in the exhaust gas treatment device.

It is advantageous for the energy flows to be precisely known for an energy model. For this purpose precise measurements of the temperature sensors are particularly important. The accuracy of the temperature sensors can be considerably increased if water hammer is avoided in the manner described above. Furthermore, the condensation of water vapor causes the energy in an exhaust gas treatment device to vary considerably, because considerable amounts of heat energy are released by the condensation. This, too, distorts the energy model and should be avoided by generally avoiding the formation of water hammer.

In accordance with yet another advantageous mode of the method of the invention, the heating by the at least one heater takes place prior to or after step a), so that the exhaust gas temperature is between a minimum temperature necessary for the reduction and a reliable maximum temperature.

As already mentioned above, the minimum temperature necessary for the reduction depends primarily on the presence of ammonia in gaseous form. With a view to reducing the hydrolysis temperature when the filling level in the reservoir is high, it is particularly advisable first to check the filling level of the at least one reservoir (step a)) and only then to proceed with heating. In the event that the filling level of the at least one reservoir is known, for example by calculation, it is possible to maintain the exhaust gas temperature between the minimum temperature and the maximum temperature by heating irrespective of any checking operations according to the method. Depending on the structure of the exhaust gas treatment device and the heater, care should always be taken to ensure that a reliable maximum operating temperature is not exceeded. This relates, in particular, to a temperature at which the desired processes in the exhaust gas treatment unit (vaporization of the reducing agent and/or hydrolysis of the reducing agent and/or thermolysis of the reducing agent and/or reduction of nitrogen oxides by the reducing agent) can run spontaneously.

In accordance with yet a further advantageous mode of the method of the invention, the reducing agent is delivered in liquid form, when the exhaust gas temperature is at least equal to or higher than the boiling temperature of the reducing agent.

When the boiling temperature of the reducing agent is reached, the liquid reducing agent can vaporize spontaneously in the exhaust gas. In this case no (further) heating energy is needed. Should the quantity of reducing agent being delivered bring about a distinct cooling of the (low) exhaust gas mass flow, however, heating may also continue at the same time.

Overall, however, it is to be noted that due to the heating in the low-load range, heat can likewise be delivered to the exhaust gas with particular efficiency, since a cooling of the heater, in particular, can thus be prevented by a high mass flow. In the low-load range the exhaust gas mass flow is low. In the low-load range the heater therefore has to heat up only a relatively small quantity of exhaust gas. In the low-load range, therefore, the heating energy needed for heating up the mass flow and for raising the exhaust gas temperature is particularly low.

In many cases there is an upper limit to the maximum temperature that can be attained by the heater. If the exhaust gas flow temperature in the low-load range is lower than in the normal load range, the temperature differential between the exhaust gas and the maximum temperature of the heater is therefore greater in such cases. The increased temperature differential, however, in turn leads to a more rapid heating of the exhaust gas. At a low exhaust gas temperature, therefore, and with a limited maximum temperature of the heater, the minimum temperature limit may be passed very rapidly.

In accordance with yet an added advantageous mode of the method of the invention, the delivery of reducing agent is interrupted if the exhaust gas mass flow no longer lies in the low-load range, or the filling level of the at least one reservoir exceeds a maximum filling level.

If the exhaust gas mass flow leaves the low-load range, the delivery of reducing agent is interrupted. In addition, that is to say independently of this, the delivery of reducing agent is interrupted if the filling level exceeds a maximum filling level. In this case there is sufficient reducing agent present in the reservoir to allow optimum operation of the exhaust gas treatment device. In a technically suitable embodiment of the exhaust gas treatment device such a maximum filling level equates to a filling level of approximately 80%. The exhaust gas treatment device is therefore able to carry out the treatment optimally even with high-load ranges, and at the same time the reducing agent is not delivered with excessive frequency.

These interruption conditions also apply, in particular, to the heating, so that heating is interrupted directly upon leaving the low-load range.

In accordance with yet an additional advantageous mode of the method of the invention, the low-load range occurs particularly during the idling of an exhaust-gas generating internal combustion engine. In this operating state low exhaust gas mass flows occur, so that heating and/or replenishment of the reservoir are especially effective and energy-efficient.

Even in the applications described herein a low-load range of an internal combustion engine can be characterized and identified by operating parameters in the manner described above. These operating parameters are, for example, an NOx untreated emission, an engine speed and/or a temperature in an exhaust gas recirculation line.

In accordance with again another advantageous mode of the method of the invention, the low-load range of the internal combustion engine is detected by an idling detection device in step b).

Such an idling detection device or detector is particularly capable of detecting the engine speed and/or the fuel-air charge of the cylinders of an internal combustion engine, to which the exhaust gas treatment device is connected. If, in this case, the internal combustion engine is in an idling state, an exhaust gas flow in the low-load range is identified from this. Reducing agent is then delivered. The detection of an idling state can also be used, by way of other parameters such as, for example, vibration of the internal combustion engine or the results of existing measuring and/or calculation devices, in connection with the operation of the internal combustion engine.

With the objects of the invention in view, there is concomitantly provided a motor vehicle, comprising an internal combustion engine, and an exhaust gas treatment device including at least one reservoir and at least one delivery device for a reducing agent together with a control unit set up or configured to perform the method according to the invention. The method according to the invention may be implemented, for example, in the nature of software in the engine control of a motor vehicle, which correspondingly communicates with sensors and/or which operates the delivery device.

Other features which are considered as characteristic for the invention are set forth in the appended claims, noting that the features individually recited in the claims can be combined with one another in any technologically suitable way and may be supplemented by explanatory details from the description, showing further structural variants of the invention.

Although the invention is illustrated and described herein as embodied in a method for operating an exhaust gas treatment device and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
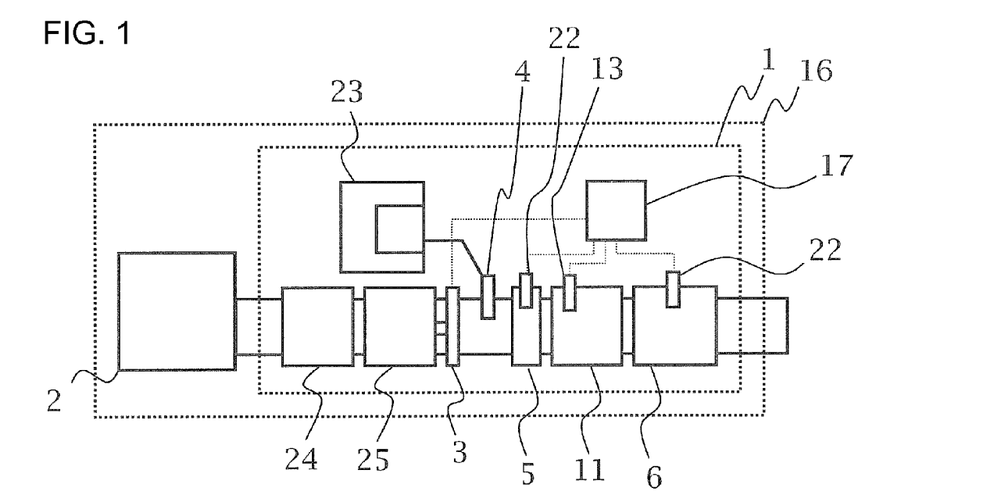
FIG. 1 is a block diagram of a motor vehicle, including an exhaust gas treatment device, which is set up to perform the method according to the invention.

Referring now in detail to the figures of the drawings which are schematic and in which the same reference numerals denote the same components and first, particularly, to FIG. 1 thereof, there is seen a motor vehicle 16, including an internal combustion engine 2 and an exhaust gas treatment device 1 connected to the internal combustion engine 2. The exhaust gas treatment device 1 includes, in series, an oxidation catalytic converter 24, a particle filter 25, a heater 3, a delivery device 4 for a reducing agent (for example a urea-water solution), a hydrolysis catalytic converter 5, a reservoir or storage device 11 and an SCR catalytic converter 6. A temperature sensor 22 is provided in the SCR catalytic converter 6. A temperature sensor 22 is likewise provided in the hydrolysis catalytic converter 5. A nitrogen sensor 13, which serves for monitoring the charging of the reservoir 11 with reducing agent, is provided in the reservoir 11. The delivery device 4 is supplied with reducing agent through a line from a reducing agent metering system 23. The heater 3 is controlled by a control unit 17 as a function of data determined by the temperature sensors 22 and the nitrogen sensor 13. The oxidation catalytic converter 24 and the particle filter 25 serve for pretreatment of exhaust gases of the internal combustion engine 2. Where necessary, the delivery device 4 may also be disposed upstream of the particle filter 25 and/or the oxidation catalytic converter 24 in the direction of flow of the exhaust gas proceeding from the internal combustion engine 2. The heater 3 may also be disposed upstream of the particle filter 25 and/or the oxidation catalytic converter 24 in the direction of flow of the exhaust gas.

Figure 2:
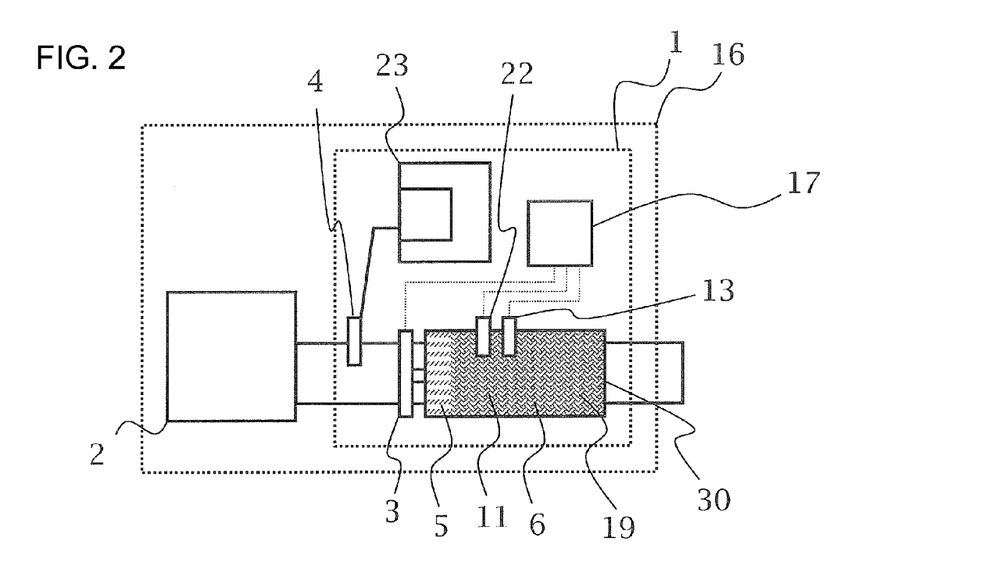
FIG. 2 is a block diagram of a further motor vehicle, including an alternative exhaust gas treatment device, which is set up to perform the method according to the invention.

FIG. 2 likewise shows a motor vehicle 16, including an internal combustion engine 2 and an exhaust gas treatment device 1. Starting from the internal combustion engine 2, a delivery device 4 for a reducing agent, which is supplied with reducing agent by a reducing agent metering system 23, is provided first in series in this exhaust gas treatment device 1. A heater 3 and an exhaust gas treatment component 30 follow the delivery device 4. Various functions are combined in the exhaust gas treatment component 30. The exhaust gas treatment component 30 contains a hydrolysis catalytic converter 5, a reservoir 11 for a reducing agent and an SCR catalytic converter 6. The SCR catalytic converter 6 and the reservoir 11 are combined in a common coating 19. The coating 19 contains reducing agent-storing constituents, which form the reservoir 11, together with selective catalytic reduction-promoting constituents, which form the SCR catalytic converter 6. A temperature sensor 22 and a nitrogen sensor 13 are provided in the exhaust gas treatment component 30. The nitrogen sensor 13 serves for determining the charging of the reservoir 11 with reducing agent. The heater 3 is controlled by a control unit 17 as a function of data determined by the temperature sensor 22 and the nitrogen sensor 13.

Figure 3:
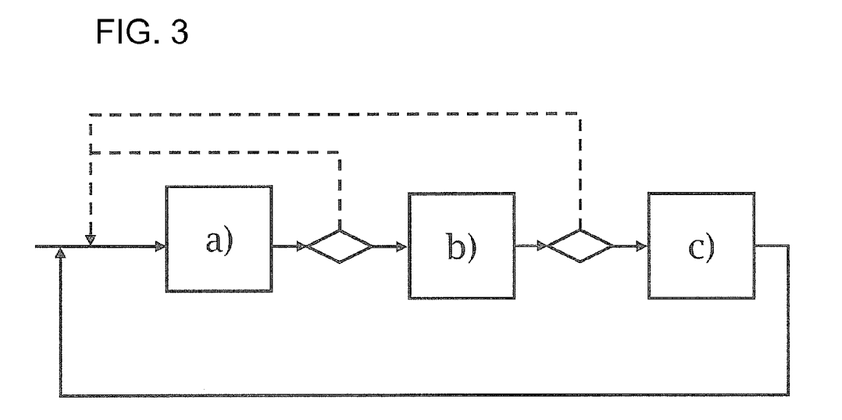
FIG. 3 is a flow diagram which represents a working sequence of the method according to the invention.

FIG. 3 shows a flow chart of the method according to the invention. FIG. 3 represents steps a), b) and c) of the method. It can also be seen that the method according to the invention is repeated in the form of a loop. According to the detection or observation in step a) as to the current filling level of at least one reservoir, step b) is performed or the loop already returns at this point if the filling level is above a minimum filling level. If the filling level lies below a minimum filling level, the current exhaust gas mass flow is checked in step b). If the exhaust gas mass flow lies in a low-load range, step c) is initiated. If this is not the case, the loop returns to step a). If the filling level and the exhaust gas mass flow conditions as defined in step c) are fulfilled, reducing agent is delivered. The loop then begins again at the beginning at step a).

Figure 4:
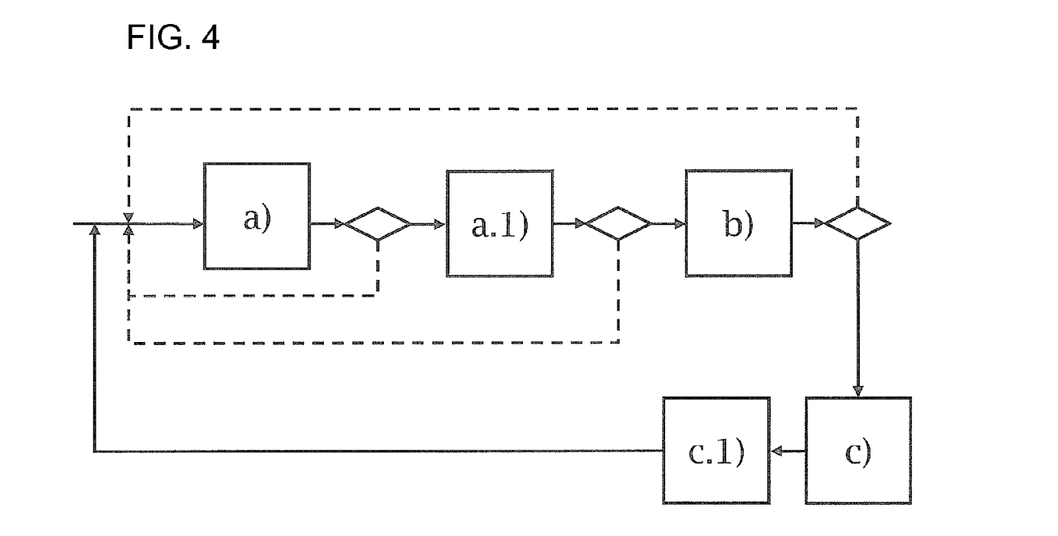
FIG. 4 is a further flow diagram which represents a further working sequence of the method according to the invention.

FIG. 4 differs from FIG. 3 in that further steps a.1) and c.1) in the method have been introduced. In step a.1) the exhaust gas temperature is checked. In step c.1) a heater raises the exhaust gas temperature of the exhaust gas flow or the reducing agent. If an exhaust gas temperature in excess of a minimum temperature limit is detected in step a.1), the method returns to step a) again in the same way as for steps a) and b) in FIG. 3. If the exhaust gas temperature is below a minimum temperature limit, the exhaust gas temperature is raised by heating in step c.1). As soon as the temperature exceeds the minimum temperature limit, the method returns to step a.1).

Figure 5:
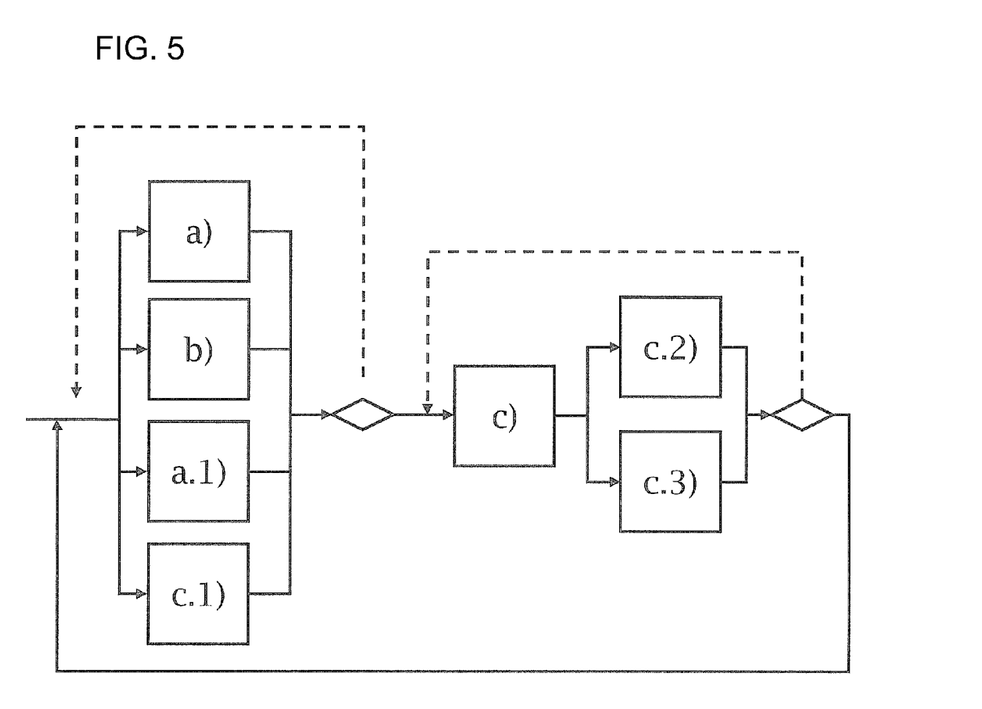
FIG. 5 is another flow diagram which represents another working sequence of the method according to the invention.

FIG. 5 shows another flow chart of the method according to the invention. Steps a), b), c), a.1) and c.1) of the method are already known from FIGS. 3 and 4. A step c.2) of the method checks whether or not the exhaust gas mass flow is in the low-load range. A step c.3) of the method checks whether or not the filling level of the reservoir is above a maximum filling level. In the flow chart represented in FIG. 5 steps a), b), a.1) and c.1) of the method are performed in parallel and given a positive outcome of the limit value check in each case step c) is initiated. As soon as step c) is active, steps c.2) and c.3) of the method are performed in parallel. If the exhaust gas mass flow is still in the low-load range and the filling level is still below a maximum filling level, step c) continues to be performed. If either step c.2) or c.3) is no longer fulfilled, the parallel method, including steps a), b), a.1 and c.1) is performed and the method runs again from the beginning.

Figure 6:
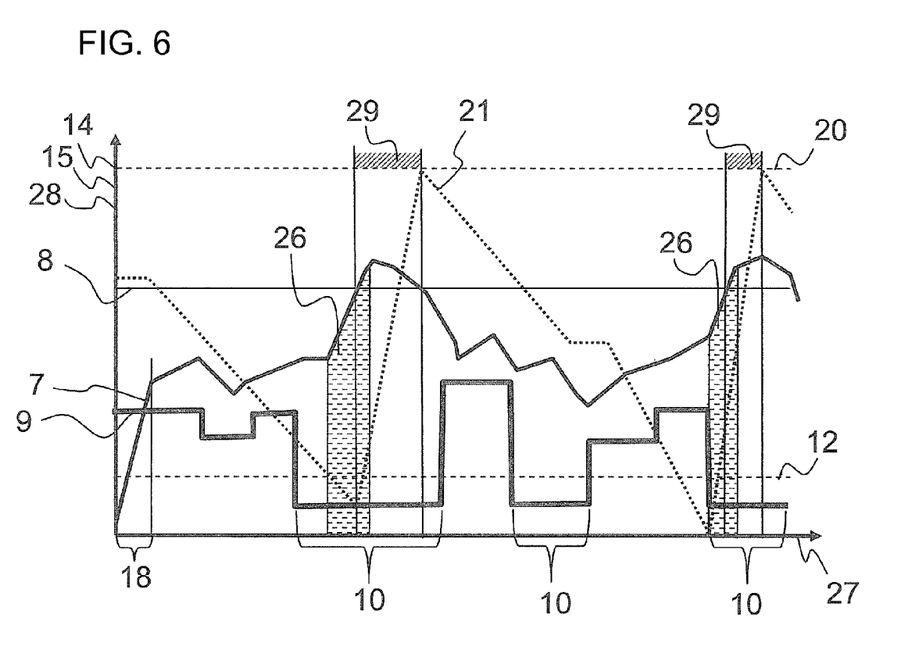
FIG. 6 is a diagram which represents various parameters of an exhaust gas treatment device during operation of the method according to the invention.

FIG. 6 shows a diagram representing various operating parameters of an exhaust gas treatment device during the operation of the method according to the invention. In this diagram the horizontal axis is a time axis 27. The vertical axis has a triple function: on one hand it serves as a mass flow axis 14 for representing a mass flow 9 through the exhaust gas treatment device 1. The mass flow 9 is substantially determined by the quantities of fuel and air, which are consumed in the internal combustion engine 2 to which the exhaust gas treatment device is connected.

The vertical axis moreover serves as a temperature axis 28 for representing a temperature 7 in the exhaust gas treatment device 1. In the diagram, a start-up phase 18 of the exhaust gas treatment device 1 is first represented over the time axis 27. In the start-up phase 18, the temperature 7 is at first still very low and rises sharply.

In addition the vertical axis serves as a charge axis 15 for representing a charge 21 of a reservoir 11 for a reducing agent or for a reducing agent precursor. This relates, in particular, to a charge 21 of an ammonia-reservoir catalytic converter with ammonia.

As soon as the start-up phase 18 is concluded, the exhaust gas treatment device 1 consumes reducing agent, or ammonia, which is stored in the reservoir 11. The charge 21 of the reservoir 11, following the start-up phase 18, therefore at first falls continuously. In various periods during the operation of the exhaust gas treatment device 1, a delivery 29 of reducing agent into the exhaust gas treatment device 1 ensues. In these periods the charge 21 of the reservoir increases again. A delivery 29 of reducing agent thereby ensues, if the following three conditions, in particular, are fulfilled:

As a first condition it is checked whether or not the charge 21 in the reservoir 11 has fallen below a minimum storage quantity 12. As a second condition it is checked whether or not the mass flow 9 through the exhaust gas treatment device is low. This is typically the case in low-load phases 10 indicated in the diagram. The low-load phases 10 are preferably idling phases, in which the internal combustion engine connected to the exhaust gas treatment device is idling. As a third condition it is checked whether or not the temperature 7 in the exhaust gas treatment device is greater than a temperature limit 8, since it is only then that the reducing agent can also be successfully stored in the reservoir. If the first and second conditions are fulfilled but the third condition is not, a heating process 26 may be carried out. This serves to raise the temperature 7 above the temperature limit 8. Since the mass flow 9 is particularly low during this heating process 26, the heating process 26 raises the temperature 7 with particular rapidity and with especially little heat energy. The delivery 29 of reducing agent could ensue as soon as the third condition is also fulfilled by the heating process 26. The delivery 29 is terminated, in particular, when the charge 21 has attained a maximum storage quantity 20.

The invention thereby at least partially solves the technical problems described in connection with the state of the art. In particular, a method has been specified for operating an exhaust gas treatment device, which allows a reliable conversion of nitrogen oxides by the SCR method even in the event of very frequent load cycles of the internal combustion engine. Moreover, an especially effective and energy-efficient strategy has been specified for the addition of the reducing agent, in particular one supplying reducing agent intermediate reservoirs within the exhaust system with reducing agent for a correspondingly modest outlay.

The invention claimed is:

1. A method for operating an exhaust gas treatment device having at least one storage device and at least one heater positioned therein, the at least one storage device, located upstream of an SCR catalytic converter for a reducing agent and the exhaust gas treatment device having at least one delivery device for the reducing agent, the method comprising the following steps:
   a) checking a filling level of the at least one storage device;
   b) detecting a current exhaust gas mass flow of an exhaust gas produced by an internal combustion engine coupled to said exhaust gas treatment device and flowing through the exhaust gas treatment device; and
   c) delivering reducing agent with the delivery device, if the filling level of the at least one storage device is below a minimum filling level and if the exhaust gas mass flow detected in step b) is in a low-load range of operation of the internal combustion engine for allowing the reducing agent delivered by the delivery device to reach the storage device;
   checking an exhaust gas temperature of the exhaust gas prior to the delivery of the reducing agent in step c); and heating at least the exhaust gas mass flow or the reducing agent with the at least one heater if the exhaust gas temperature is below a minimum temperature limit.

2. The method according to claim 1, which further comprises prior to step c), evaluating the current exhaust gas mass flow checked in step b) with an energy model, to determine if reducing agent is delivered in step c).

3. The method according to claim 2, which further comprises also taking into account, in the energy model, an amount of energy produced by at least one chemical or physical reaction when a quantity of reducing agent is delivered.

4. The method according to claim 1, which further comprises prior to step c), evaluating the current exhaust gas mass flow checked in step b) and a checked influencing variable of a heater with an energy model, to determine if at least one of the following actions is performed in step c):
   heating at least the exhaust gas flow or the reducing agent; or
   delivering reducing agent.

5. The method according to claim 4, which further comprises also taking into account, in the energy model, an amount of energy produced by at least one chemical or physical reaction when a quantity of reducing agent is delivered.

6. The method according to claim 1, which further comprises performing the heating step with at least the one heater to cause the exhaust gas temperature to lie between a minimum temperature necessary for reduction and a reliable maximum temperature.

7. The method according to claim 1, which further comprises carrying out the step of delivering the reducing agent in liquid form when an exhaust gas temperature is at least equal to a boiling temperature of the reducing agent.

8. The method according to claim 1, which further comprises interrupting the delivery of reducing agent if the exhaust gas mass flow no longer lies in the low-load range or the filling level of the at least one storage device exceeds a maximum filling level.

9. The method according to claim 1, wherein the low-load range occurs during idling of an exhaust-gas generating internal combustion engine.

10. The method according to claim 1, which further comprises detecting the low-load range of the internal combustion engine by determining idling in step b).

11. A motor vehicle, comprising:
an internal combustion engine; and
an exhaust gas treatment device configured to treat exhaust gas of said internal combustion engine, said exhaust gas treatment device having at least one storage device for a reducing agent, at least one delivery device for the reducing agent and a control unit configured to perform the method according to claim 1.

12. A method for operating an exhaust gas treatment device having at least one reservoir for a reducing agent, located upstream of an SCR catalytic converter and at least one delivery device for the reducing agent, the method comprising the following steps:

a) checking a filling level of the at least one reservoir;

b) checking detecting a current exhaust gas mass flow; and c) delivering reducing agent with the delivery device, if the filling level of the at least one reservoir is below a minimum filling level and the exhaust gas mass flow is in a low-load range;

providing the exhaust gas treatment device with at least one heater;

checking an exhaust gas temperature prior to step c); and heating at least the exhaust gas flow or the reducing agent with the at least one heater if the exhaust gas temperature is below a minimum temperature limit.

\* \* \* \* \*